G. W. BENT.
CASTER.
APPLICATION FILED MAR. 30, 1905.
966,788.
Patented Aug. 9, 1910.
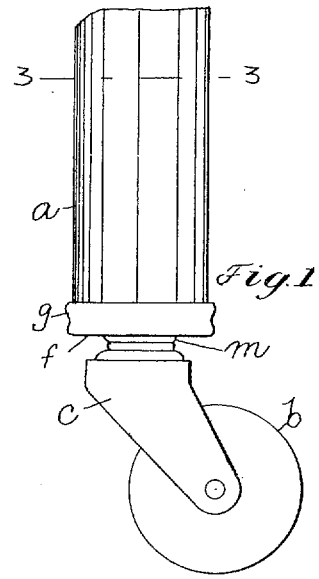
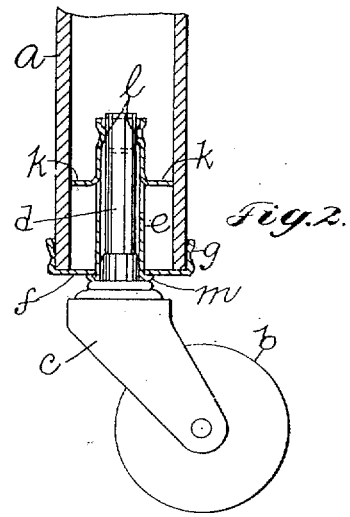
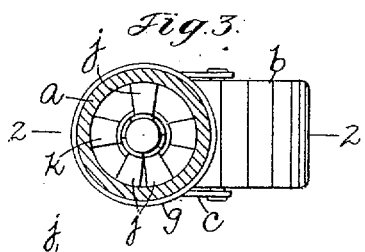
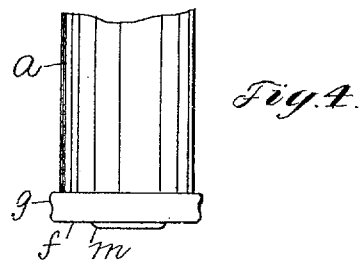
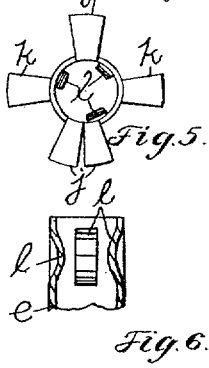
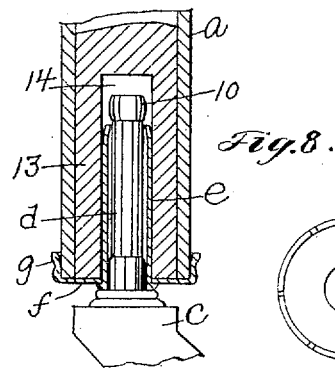
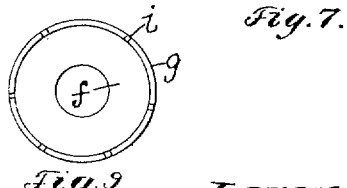
Witnesses.
Inventor:
George W. Bent
by Jas. H. Churchill
Atty.

UNITED STATES PATENT OFFICE.

GEORGE W. BENT, OF HYDE PARK, MASSACHUSETTS.

CASTER.

966,788.

Specification of Letters Patent. Patented Aug. 9, 1910.

Application filed March 30, 1905. Serial No. 252,837.

*To all whom it may concern:*

Be it known that I, GEORGE W. BENT, a citizen of the United States, residing in Hyde Park, in the county of Norfolk and State of Massachusetts, have invented an Improvement in Casters, of which the following description, in connection with the accompanying drawings, is a specification, like letters on the drawings representing like parts.

This invention relates to a furniture caster especially designed and adapted among other uses, to be employed on metallic beds having tubular posts.

The invention has for its object to provide a simple and efficient caster for the purpose specified, and one in which the socket piece or bushing for the pintle of the caster, is held firmly in its place within the hollow post and prevented from being forced up into the hollow post when the pintle is inserted into its socket, and preferably also prevented from being removed from said hollow post by the withdrawal of the pintle from its socket. The socket piece may and preferably will be constructed as will be described. These and other features of this invention will be pointed out in the claims at the end of this specification.

Figure 1 is an elevation of a sufficient portion of a hollow post of a metallic bed provided with a caster embodying this invention, to enable the invention to be understood. Fig. 2, a partial section and elevation of the hollow post and caster shown in Fig. 1, the section being taken on the line 2—2, Fig. 3. Fig. 3, a cross section on the line 3—3, Fig. 1. Fig. 4, an elevation of the hollow post with the caster removed. Figs. 5 and 6, details of the socket piece shown in Fig. 2. Fig. 7, an elevation of the socket piece shown in Fig. 2, and Figs. 8 and 9, modifications to be referred to.

Referring to the drawings, $a$ represents a hollow metal post, such as the hollow post of a metallic bed. The hollow post $a$ is provided with a caster embodying this invention, and comprising the caster wheel $b$, journaled in the frame $c$ provided with a pintle $d$ which may be made cylindrical and of uniform diameter as represented in Fig. 2, to fit into a socket piece or bushing $e$, upon which is fitted a cap $f$ provided with an upturned flange $g$, which may and preferably will be made continuous and annular in shape to engage the outer circumference of the hollow post $a$, to prevent the cap being removed while in use and also when the pintle is withdrawn from its socket.

Instead of providing the cap with an upturned flange which is continuous, the latter may be made non-continuous as represented in Fig. 9, to form sections which are separated by spaces $i$. The bushing or socket piece $e$ may be made from a flat piece of sheet metal, which is bent to form a cylinder or tube, and is cut or stamped to form projections or arms for a purpose as will be described. As represented in Figs. 3 and 5, the upper end of the tube or cylinder is cut so as to form a plurality of arms $j$, herein shown as three in number, which are bent down and outwardly and are of a length substantially equal to the distance between the tubular socket and the inner wall of the hollow post (see Fig. 3) so as to prevent undue lateral movement of the socket piece within said hollow post. Additional guide arms $k$ may be formed by turning outward and preferably upward portions of the tube below its upper end as represented in Figs. 2 and 3. The tubular socket piece $e$ may be further provided on its inner surface with projections $l$ formed by pressing in portions of the tube, which projections frictionally engage the pintle $d$, as represented in Fig. 2, and retain said pintle in its socket against accidental removal therefrom.

The cap $f$ is fitted on the socket piece $e$ and retained thereon by an outwardly extended flange $m$ at the lower end of said socket piece, and said cap may be fitted on the socket piece $e$ sufficiently tight, as represented in Figs. 2 and 8 to prevent the latter from being drawn out of the cap when the pintle is removed from the socket piece. To facilitate engagement of the cap with the outer circumference of the metal post $a$, and especially when said outer circumference is rough or irregular, the upturned flange $g$ has its upper portion made flaring outwardly, while its lower portion is made of substantially the external diameter of the post so as to frictionally engage the outer circumference of said post and retain the cap thereon.

By reference to Fig. 2, it will be seen that the cap $f$ engaging the lower end of the hollow post, serves to prevent the socket piece being forced up into said post and out of its proper position when the pintle is forced up into the socket piece, and that the flange g on the cap serves to retain the latter on the hollow post when the caster is removed.

I may prefer to make the socket piece from a flat piece of sheet metal, but I do not desire to limit my invention in this respect, as the said socket piece may be made from a cylindrical tube, as shown in Fig. 8, said tube being contracted at its upper end to coöperate with a head 10 on the pintle to retain the pintle in said socket.

I may prefer to make the centering means for the socket piece in the form of arms j, k, as shown in Fig. 3, but I do not desire to limit myself in this respect, as said centering means may be made in the form of a tubular block 13 of wood or other material, which fits substantially tight in the hollow post and is provided with an opening 14 for the reception of the socket piece e. I may prefer to retain the cap on the hollow post by the frictional engagement of the flange g with said post.

Claims:

1. In a caster, in combination, a tubular socket piece having arms extended outwardly substantially at right angles thereto and provided on its inner side with a projection to engage the pintle of the caster and having an outwardly extended flange at its lower end, a disk or cap fitted on said socket piece and resting on the flange thereof, and having an upwardly extended flange flaring at its upper end, and the caster pintle extended into said socket piece and engaging the projection on the inner side thereof, substantially as described.

2. In a caster, in combination, a tubular socket piece made from sheet metal bent to form a tube and provided at its upper end with downwardly bent and outwardly extended arms and having below its upper end upwardly bent and outwardly extended arms, a cap on said socket piece having an upwardly extended flange, and a pintle extended into said socket piece.

3. In a caster, in combination, a tubular socket piece made from sheet metal bent to form a tube and provided with outwardly extended arms and with an outwardly extended flange, a cap on said socket piece having an upwardly extended flange, said cap being fitted on said socket piece and resting on said flange, and a pintle extended into said socket, substantially as described.

4. The combination with a hollow cylindrical metal post, of a tubular socket piece inserted therein, a cap on said socket piece having an upturned flange in frictional engagement with the circumference of said hollow post, and means within said hollow post coöperating with said socket piece and the inner circumference of said post to restrict lateral movement of said socket piece, substantially as described.

5. The combination with a hollow post, of a cap covering the end of said post and provided with an upturned flange in frictional engagement with the outside of said post, a pintle extended through said cap into the hollow post, a tubular bearing for said pintle extended through said cap, means to retain said cap on said bearing, and means for centering said tubular bearing in said hollow post and restricting lateral movement thereof, substantially as described.

6. The combination with a hollow metal post, of a metal cap covering the end of the said post and provided with an upturned flange in frictional engagement with the outside of said post to retain the cap thereon, a pintle extended through said cap into the hollow post, a bearing for said pintle extended through said cap into said post and provided with means to engage the under surface of said cap, and means for centering said bearing in said hollow post and for restricting lateral movement thereof, substantially as described.

7. A caster for tubular legs having an interior pintle-supporting frame or socket, a leg mount for exteriorly centering the foot of the leg, and spring means for acting frictionally on the exterior of the leg.

8. A caster having a leg supporting disk centered on the pintle, means for centering the pintle against the interior of a tubular leg, and means for centering the disk and pintle against the exterior surface of the leg and for producing friction thereon to secure the disk to the leg.

9. A caster for tubular legs combining a pintle-centering socket, a leg supporting disk, a leg mount, and securing means acting on the exterior surface of the leg to hold the caster to the leg, said means comprising one or more resilient members presenting an inclined face or faces to the exterior of the leg, whereby the leg may be thrust into the said leg mount and the members caused to yield outward.

10. A caster for tubular legs having parts for coacting with the interior of such legs and parts coacting frictionally with the exterior of the legs to hold the caster thereto by friction only.

11. The combination with a hollow post, of a cap covering the end of said post and provided with an up-turned flange in frictional engagement with the outside of said post, a pintle extended through said cap into the hollow post, a tubular bearing for said pintle extended through said cap, and means within the hollow post to limit lateral movement of the said tubular bearing, substantially as described.

12. A caster for hollow metallic legs or posts having an interior pintle-supporting frame or socket, a leg mount for exteriorly centering the foot of the leg, and means for frictionally securing the socket to the hollow leg or post, substantially as described.

13. A caster having a pintle and a detachable socket for tubular legs, the socket of which has means for preventing its being thrust too far into the leg and is adapted to be frictionally retained in the leg and to hold the pintle, and the pintle of which is provided with a combined leg-supporting member and leg mount which is adapted to surround and center the foot of the leg.

14. A caster for tubular legs having a pintle, a socket adapted to be held in the leg and which detachably and separably secures the pintle to itself (the socket) and thereby to the leg, and having a leg mount which surrounds and centers the end of the leg relatively to the pintle.

15. A caster having a leg mount secured to its pintle and a socket detachably holding the pintle and adapted to fit and be held within the interior of a tubular leg.

16. A caster having a combined leg mount and disk for centering and supporting the foot of a tubular leg, a spring socket or frame secured to such combined mount and disk, and a pintle which is centered in the said combined mount and disk and in the said socket or frame and secured thereto.

17. A caster having a combined retaining socket or frame and leg mount provided with means for detachably securing them to a tubular leg and to the caster pintle.

18. A caster having a combined socket or frame and leg mount adapted to be frictionally held to a tubular leg, said leg mount surrounding and centering the leg, and the pintle detachably secured to the socket or frame and received in and centered by the leg mount.

19. A caster having a retaining socket or frame, leg mount and pintle, the socket or frame being secured to the leg mount and detachably securing the pintle, and adapted to fit and be frictionally retained within a tubular leg, the leg mount being adapted to surround and center the foot of the leg, and the pintle being centered by the socket or frame and the leg mount.

20. A caster having a retaining socket or frame adapted to fit the tubular leg, a pintle held therein and a leg mount for surrounding the foot of the leg directly secured to the said socket or frame.

21. In a caster, in combination, a cap capable of covering the end of a hollow metal post and provided with an upturned flange capable of frictionally engaging the exterior of said post, a pintle-receiving socket piece secured to said cap to move therewith and capable of being extended into said hollow post, and means coöperating with said socket piece for centering it within the hollow post, substantially as described.

22. The combination with a hollow metal post or leg, of a cap covering the end of the hollow post and provided with an upwardly extended flange surrounding the outer surface of the said post, a pintle-receiving socket piece secured to said cap and extended up into the hollow post, and means for centering the upper end of said socket piece in said post, substantially as described.

23. The combination with a hollow post, of a cap covering the end of said post, a socket piece extended through said cap into said post, and a tubular block of non-metallic material inserted into said post and having a substantially tight fit therewith, and provided with a longitudinally extended opening into which said socket piece is extended, substantially as described.

24. The combination with a hollow post, of a tubular block of non-metallic material inserted into said post and having a substantially tight fit therewith, and provided with a substantially central longitudinally extended opening for the reception of a caster pintle, and means within said opening coöperating with said pintle to detachably engage the latter, substantially as described.

In testimony whereof, I have signed my name to this specification in the presence of two subscribing witnesses.

GEORGE W. BENT.

Witnesses:
    JAS. H. CHURCHILL,
    J. MURPHY.